United States Patent [19]
Mackenzie et al.

[11] Patent Number: 6,057,997
[45] Date of Patent: May 2, 2000

[54] CIRCUIT BREAKER RESPONSIVE TO REPEATED IN-RUSH CURRENTS PRODUCED BY A SPUTTERING ARC FAULT

[75] Inventors: Raymond W. Mackenzie, Baldwin Borough; Joseph C. Engel, Monroeville Boro, both of Pa.

[73] Assignee: Eaton Corporation, Cleveland, Ohio

[21] Appl. No.: 09/324,560

[22] Filed: Jun. 3, 1999

Related U.S. Application Data

[63] Continuation of application No. 08/336,721, Nov. 4, 1994, Pat. No. 5,940,256, which is a continuation of application No. 08/023,435, Feb. 26, 1993, abandoned.

[51] Int. Cl.⁷ .................................................. H02H 3/00
[52] U.S. Cl. .................................................. 361/42
[58] Field of Search ........................................ 361/45–50

[56] References Cited

U.S. PATENT DOCUMENTS

| | | | |
|---|---|---|---|
| Re. 30,678 | 7/1981 | Van Zeeland et al. | 361/44 |
| 3,673,455 | 6/1972 | Dewey | 361/42 |
| 3,852,642 | 12/1974 | Engel et al. | 361/42 |
| 4,081,185 | 3/1978 | Lane | 277/212 C |
| 4,376,243 | 3/1983 | Renn et al. | 361/93.1 |
| 4,402,030 | 8/1983 | Moser et al. | 361/93.1 |
| 4,466,071 | 8/1984 | Russell, Jr. | 361/44 |
| 4,897,756 | 1/1990 | Zylstra | 361/44 |
| 4,949,214 | 8/1990 | Spencer | 361/42 |
| 5,224,006 | 6/1993 | MacKenzie et al. | 361/45 |
| 5,280,404 | 1/1994 | Ragsdale | 361/113 |
| 5,519,561 | 5/1996 | Mrenna et al. | 361/105 |

FOREIGN PATENT DOCUMENTS 1210847 9/1986 Canada .

OTHER PUBLICATIONS

Raytheon Company, Semiconductor Division, RV4145 Low Power Ground Fault Interrupter, Raytheon, pp. 1–8. No Date.

Shiping Li, B. Don Russell, *Optimal Arcing Fault Detection Using Signal Processing Techniques*; Electric Power Systems Research, 21 (1991), pp. 121–128.

*Primary Examiner*—Ronald W. Leja
*Attorney, Agent, or Firm*—Martin J. Moran

[57] ABSTRACT

A circuit breaker responds to sputtering arc faults by counting the times that a bandwidth limited di/dt signal exceeds a threshold magnitude within a selected time interval. In the exemplary circuit breaker, if the threshold is exceeded twice within a one second interval, a trip solenoid is energized. The di/dt sensor can share a sensing coil with a ground fault detector. Alternatively, the resistance of the neutral lead within the circuit breaker is utilized to sense current which is converted to a bandwidth limited di/dt signal for level detection and counting of sputtering arc events.

2 Claims, 3 Drawing Sheets

CIRCUIT BREAKER RESPONSIVE TO REPEATED IN-RUSH CURRENTS PRODUCED BY A SPUTTERING ARC FAULT

CROSS REFERENCE TO RELATED APPLICATION

This application is a continuation of application Ser. No. 08/336,721, filed Nov. 4, 1994, now Pat. No. 5,940,256, which in turn is a continuation of application Ser. No. 08/023,435, filed on Feb. 26, 1993, now abandoned.

BACKGROUND OF THE INVENTION

1. Field of the Invention

This invention relates to circuit breakers which respond to sputtering arc faults as well as bolted line-to-neutral and ground faults and, more particularly, to such a circuit breaker which discriminates between sputtering arc faults and in-rush currents generated by connecting certain loads to the protected conductors.

2. Background Information

Conventional residential circuit breakers have a thermal trip device which responds to persistent over currents of moderate magnitude to provide a delayed trip, and a magnetic trip device which responds instantaneously to over currents of large magnitude. Thus, the fault current must reach a predetermined magnitude, for example ten times rated current for the instantaneous trip to occur, or the overcurrent must sustain a predetermined average value over a given time interval to implement the delayed trip. There is a type of fault, however, which may not produce either the peak magnitude required for the instantaneous magnetic trip or the sustained average overcurrent necessary for the delayed trip, yet may pose a fire hazard. This is the intermittent or sputtering arc-type of fault. Such a fault can occur, for instance, between two conductors that are in close proximity, but not touching so that an arc is struck between the conductors. This arc can produce a temperature high enough to melt the copper in the conductor. The melted droplets of copper can ignite flammable material in the vicinity. The resistance of the wire may be high enough to limit the peak current and the ac current cyclically passes through zero to extinguish the arc so that the average current is low. Thus, the conventional circuit breaker does not respond to the fault, although a hazard exists. This is especially true in the case of a stranded wire extension cord where an individual strand can be melted at a relatively low fault current.

A sputtering arc fault typically occurs near the peak of the ac voltage waveform thereby resulting in a step increase in current. This is due to the electrostatic force which causes the conductors to move toward each other. Also, if the voltage and the field are large enough a conduction may be indicated. As the current increases, the magnetic field pushes the electrodes apart producing an arc which is extinguished as the alternating current passes through zero.

The above cross-referenced patent application discloses a circuit breaker which takes advantage of this difference between the sinusoidal wave form of a line-to-neutral fault and the step wave form of a sputtering arc fault by monitoring the rate of change of current, di/dt, in the protected circuit. The di/dt signal is bandwidth limited. The selection of the band provides control of relative sensitivity of the circuit breaker to the sinusoidal over currents produced by overcurrent faults and step currents associated with sputtering arc-type faults. This circuit breaker includes a ground fault detector of the dormant oscillator type. The sputtering arc feature of the circuit breaker shares a common di/dt sensing coil on the neutral conductor with the ground fault detector.

The arcing wave form characterized by fast turn on to high values of current produced by sputtering arc faults is also produced by some appliances, or groups of appliances switched on simultaneously. For instance, an iron which is turned on at the peak of the voltage wave form results in a step increase in current. Also, a television receiver with a transformer less power supply turned on at a peak of the ac wave form can result in a large in-rush current. Typically, the magnitude of the in-rush currents produced by these appliances is not as large as a sputtering arc fault and, thus, the circuit breaker of U.S. Pat. No. 5,224,006 can avoid false trips by appropriate setting of the threshold level of the bandwidth limited di/dt signal.

It would be desirable; however, to be able to discriminate between sputtering arc faults and in-rush currents produced by some appliances, so that the threshold of detection of the sputtering arc wave form could be lowered to provide greater protection for the conductors to which the circuit breaker is connected.

SUMMARY OF THE INVENTION

This need and others are satisfied by the invention which recognizes that the size able in-rush currents generated by appliances are singular events, while a wiring failure will continue to produce high step currents until interrupted, or until there is no more available copper in the area of the failure. Hence, in accordance with the invention, protection is achieved, along with freedom from false tripping, by tripping only in response to multiple events detected within a short period of time. As high in-rush currents produced by appliances are singular events, the preferred embodiment of the invention trips upon detection of the second event. The selected time period must be long enough to include two events from a single wiring failure while not being so long as to be likely to include sequential turn-on of multiple loads. A period of about one second is preferred to suit both cases.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENTS

The invention will be described as applied to a conventional residential circuit breaker such as that described in U.S. Pat No. 4,081,852 which is herein incorporated by reference. That circuit breaker includes a thermo-magnetic overcurrent trip mechanism and a ground fault detector mounted in side-by-side compartments within a molded housing. The ground fault detector includes a trip solenoid having a plunger which extends through the wall between the two compartments in the molded housing to actuate the thermo-magnetic trip mechanism to trip the circuit breaker in response to a ground fault.

Figure 1:
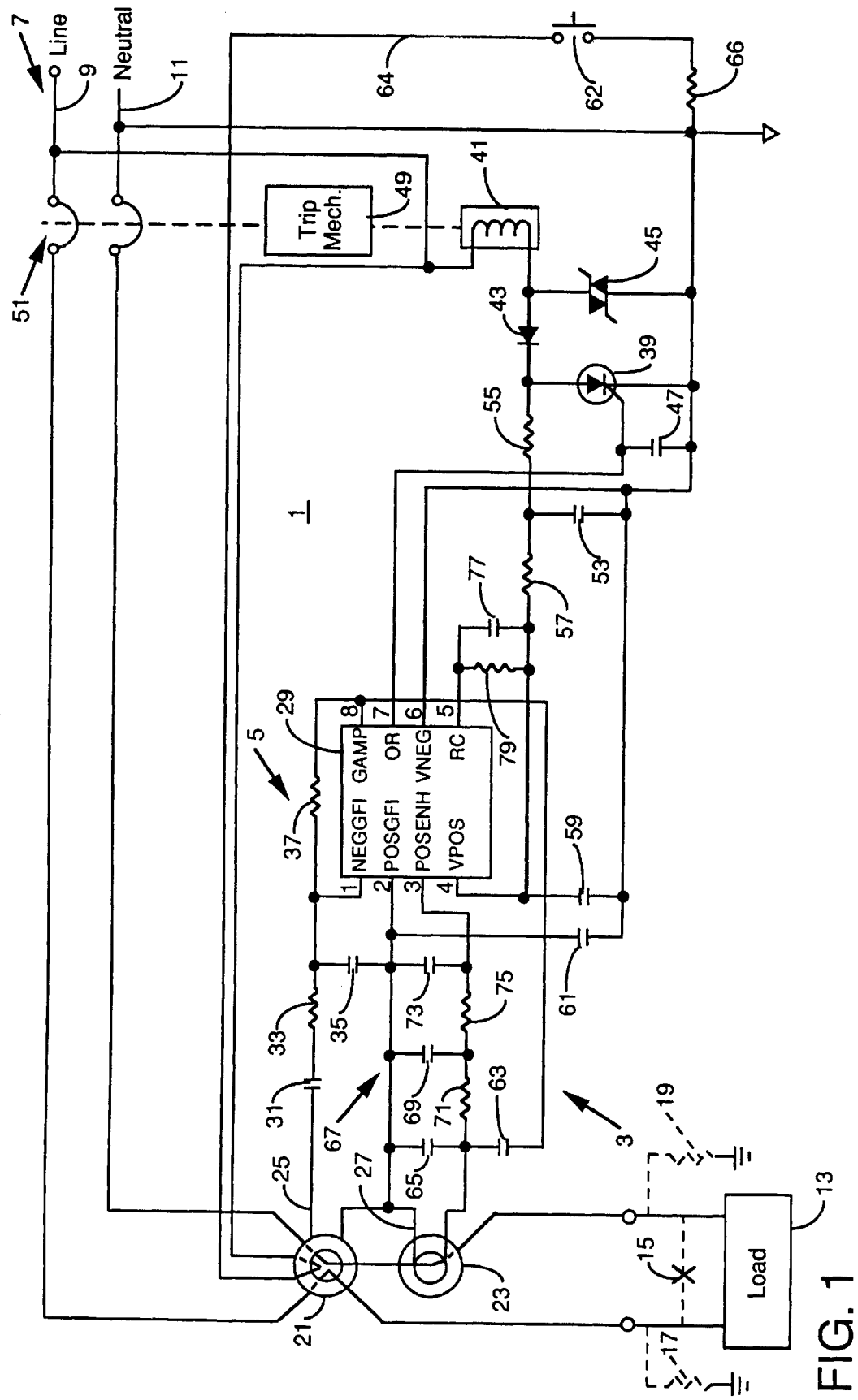
FIG. 1 is a schematic diagram of a preferred embodiment of the sputtering arc fault circuit breaker of the invention combined with, and sharing a sensing coil with, a ground fault detection circuit.

As shown in FIG. 1, the circuit breaker 1 of the invention, in its preferred embodiment, combines a sputtering arc detector 3 with a ground fault detector 5. The circuit breaker 1 protects an electric system 7 which includes a line conductor 9 and a neutral conductor 11 which provide electric power to a load 13. In addition to protecting against typical over currents drawn by the load 13 and bolted line-to-neutral faults, the circuit breaker 1 of the invention protects against sputtering arc faults 15 between the line conductor 9 and a neutral conductor 11, and line-to-ground faults 17 and neutral-to-ground faults 19. As discussed above, the sputtering arc fault 15 results when bared sections of the line and neutral conductors come in contact due to, for instance, worn or stripped insulation.

Faults in the electrical system 7 are detected by the circuit breaker 1 by current sensors in the form of current sensing transformers 21 and 23. These current sensing transformers 21 and 23 are toroidal coils. The line conductor 9 and neutral conductor 11 are passed through the opening in the toroidal coil 21 to form the primary of that current transformer. The current transformer 23 has a single primary in the form of the neutral conductor 11 which passes through the opening of the toroidal coil. The second winding 25 of the current transformer 21 and the second winding 27 of the current transformer 23 are each connected to an integrated circuit 29.

The current transformer 21 detects line-to-ground faults. With no line-to-ground fault on the electrical system 7, the currents through the line and neutral conductors 9, 11 which form the primaries of the transformer will be equal and opposite so that no current will be induced in the secondary winding 25. If the line conductor 9 is grounded, there will be a large current through this conductor and little or no current through the neutral conductor 11 so that a sizable current will be induced in the secondary winding 25. This signal is applied to the IC 29 through the NEGGFI and POSGFI inputs through a dc blocking capacitor 31 so that offsets in an op amp (to be described) in the IC are not applied to the current transformer 21. A resistor 33 critically dampens resonance caused by the series connected capacitor 31 and secondary winding 25 of the current transformer 21. A capacitor 35 across the IC inputs provides noise suppression. A feedback resistor 37 sets the gain for the op amp in the IC 29.

As will be discussed in more detail below, if the magnitude of the current in the secondary winding 25 of the current transformer 21 exceeds a threshold selected to detect a line-to-ground fault, the OR output on the IC 29 goes high to turn on an SCR 39. Turning on of the SCR 39 provides current for energization of a trip solenoid 41 with current drawn from the line and neutral conductors. This current is half wave rectified by the diode 43. The SCR 39 is protected from surges by the metal oxide varistor (MOV) 45 and from noise on the gate by capacitor 47. Energization of the trip solenoid 41 actuates the trip mechanism 49 as described in U.S. Pat. No. 4,081,852 to open contacts 51 at least in the line conductor 9, and preferably also in the neutral conductor 11.

The diode 43 also provides DC power to a shunt regulator in the IC 29. The current drawn by the IC is insufficient to actuate the trip solenoid 41. The power supply for the IC 29 includes a filter capacitor 53, and a pair of resistors 55 and 57 which determine the voltage level of the supply. This DC power is provided to the VPOS input of the IC 29. The VNEG pin is connected to the ground for the neutral conductor. A bypass capacitor 59 assures that there is no ac on the VPOS input. Similarly, another bypass capacitor 61 eliminates ac on the POSGFI input.

A test button 62 connects a test lead 64 passing through the coil 21 across the conductors 7, 11 to test the line to ground portion of the ground fault circuit. Resistor 66 limits the test current. The ground fault detector 5 is of the dormant oscillator type. The secondary winding 27 of the current transformer 23 is also connected to the output of the op amp in the IC 29 at pin GAMP through a coupling capacitor 63. Neutral-to-ground faults couple the secondary windings 25 and 27 though the current sensing transformers 21 and 23 to form a feedback loop around the IC 29 causing the op amp in the IC to oscillate. The frequency of this oscillation can be set by the selection of the value of the capacitor 63 and the capacitor 65 as well as the parameters of the current sensing transformers 21 and 23. In the exemplary circuit breaker, this frequency is about 20 KHz. When the magnitude of the oscillation exceeds selected thresholds, the SCR 39 is fired to trip the circuit breaker.

In accordance with the invention, the current sensing transformer 23 is also used to sense current for detecting sputtering arc faults. The rate of change of current signal, di/dt, needed for sputtering arc fault detection, is generated by providing a core in the current sensing transformer 23 which does not saturate at the current level required to produce a trip. A suitable material for the core is powdered iron which has a low mu and a high flux saturation level. Such a core only affects the neutral ground detection by increasing the frequency of oscillation by a small amount.

The di/dt signal produced on the secondary winding 27 of the current sensing transformer 23 is bandwidth limited by passing it through a low pass filter 67. This is a two pole low pass filter with the first pole formed by the capacitor 69 and resistor 71, and the second pole formed by the capacitor 73 and resistor 75. This low pass filter 67 in the exemplary circuit breaker has a half-power point at about 2 KHz. As discussed in the above referenced patent application, the di/dt signal can be used to provide an indication of overcurrent, line-to-neutral faults and sputtering arc faults. The parameters of the bandwidth limiting low pass filter 67 are selected to attenuate the spikes in the di/dt signal caused by a sputtering arc fault, and to regulate the relative sensitivity of the circuit to the sinusoidal currents of the overcurrent line-to-neutral faults and step functions of the sputtering arc faults. As also discussed above, the present invention distinguishes sputtering arc faults from the in-rush currents caused by some appliances by counting the number of step functions detected within a predetermined time period. A capacitor 77 and resistor 79 set the selected time interval in the manner to be discussed below.

Figure 2:
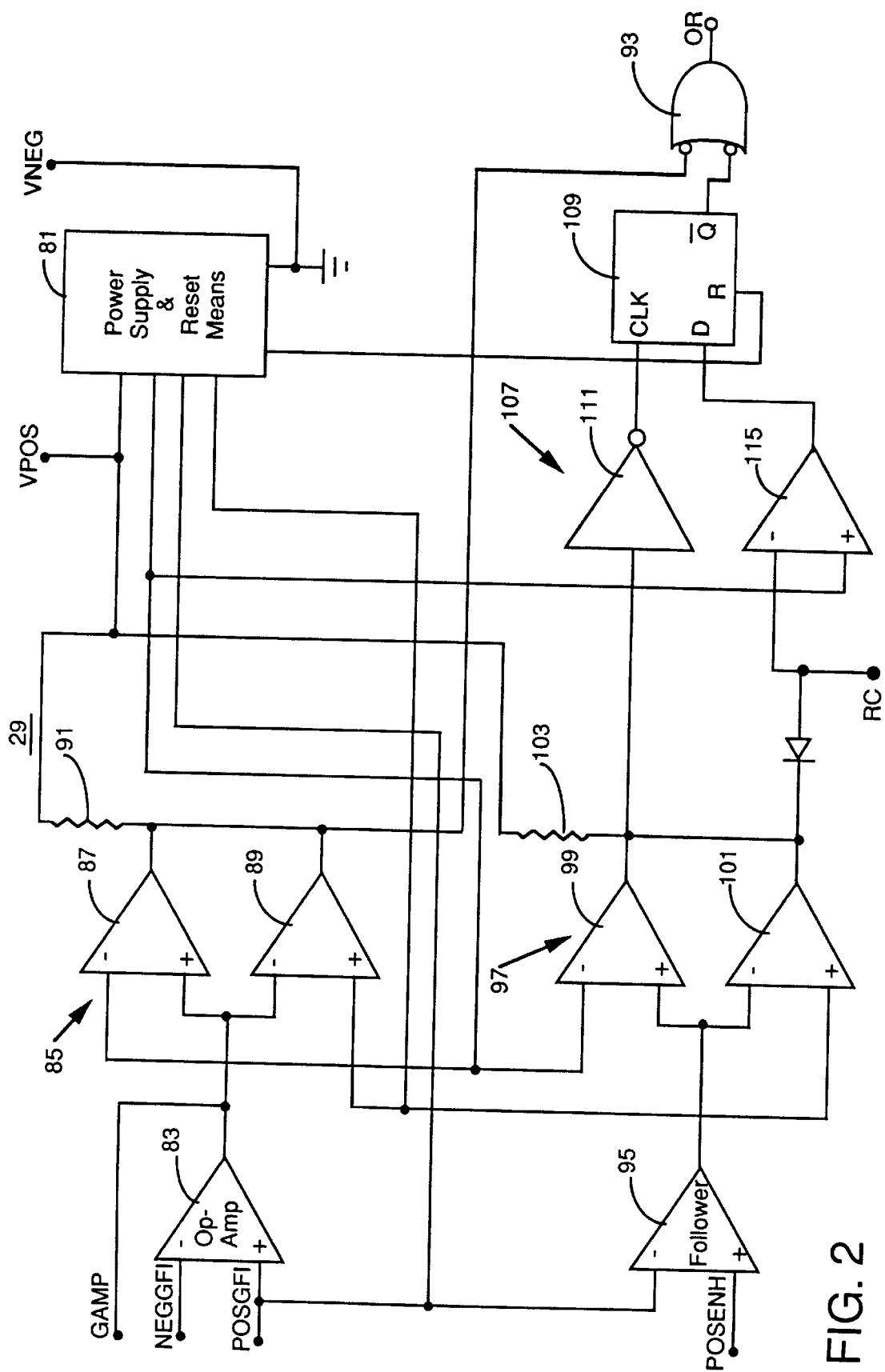
FIG. 2 is a schematic circuit diagram of an integrated circuit which forms part of the circuit of FIG. 1.

FIG. 2 is a schematic circuit diagram of the IC 29. The chip 29 has a power supply 81 which is energized by the half wave rectified supply described above through the VPOS and VNEG pins. An op amp 83 amplifies the signal on the secondary of the current sensing transformer 21 for application to a window comparator 85 comprising the comparators 87 and 89. The comparator 87 is biased by a reference voltage provided by the power supply 81 which is the positive threshold for detecting line-to-ground faults. Similarly, a negative threshold bias voltage is applied to the comparator 89. A bias voltage, which is roughly the midpoint of the power supply voltage, is applied to the noninverting input of the op amp 83. A pull-up resistor 91 is connected between the outputs of the comparators 87 and 89 and VPOS. The output of these comparators is also connected to an inverting input of an OR circuit 93, the output of which is connected to the gate of the SCR 39 through the OR pin of the IC 29. Normally, the outputs of the comparators 87 and 89 are high so that the SCR 39 is not gated. The presence of a line-to-ground fault causes a signal generated on the secondary winding 25 of the current sensing transformer 21 to exceed the thresholds applied to the comparators 87 and 89 during alternate half cycles of the load current. Positive half cycles of the ground fault current cause the output of comparator 87 to go low so that the output of the OR circuit 93 goes high to gate the SCR 39 and energize the trip solenoid 41. On negative half cycles, the comparator 89 turns on the SCR 39.

As previously discussed, for neutral-to-ground faults, the second current sensing transformer 23 is connected to the output of the op amp 83 through co coupling capacitor 63 connected to the GAMP pin of the IC 29. Any neutral-to-ground fault completes a feedback loop between the current sensing transformer 23 connected to the output of the op amp 83 and the current sensing transformer 21 connected to the input. When the magnitude of this oscillation exceeds the thresholds of the window comparator 85, the SCR 39 is gated through the OR 93.

As mentioned, the current sensing transformer 23 is also used to detect sputtering arc faults. The di/dt signal generated on the secondary winding 27, which is bandwidth limited by the low pass filter 67, is applied through a follower op amp 95 to a second window comparator 97 comprising the comparators 99 and 101. The comparators 99 and 101 compare the bandwidth limited di/dt signal to positive and negative thresholds set by the power supply 81. A pull-up resistor 103 connected to VPOS maintains a high logic signal at the outputs of the comparators 99 and 101 when the bandwidth limited di/dt signal is within the selected limits. When a current wave form representative of a sputtering arc fault is detected, the output of the window comparator 97 goes low. As certain appliances can generate a similar wave form, albeit typically of lower magnitude, a counter circuit 107 is provided on the output of the window comparator 97. The counter circuit 107 counts events in which the thresholds of the window comparator 97 are exceeded. In the preferred embodiment of the invention, the counting circuit 107 generates a trip signal upon the occurrence of two such events within the selected time interval.

The counter circuit 107 includes a D flip-flop 109. The flip-flop 109 is clocked by the output of the window comparator 97 through an inverter 111. The output of the window comparator 97 is also connected through a diode 113 to the inverting input of a comparator 115. This comparator 115 compares the output of the window comparator 97 with the positive threshold voltage generated by the power supply 81. Typically, this reference voltage is about three-quarters of the power supply voltage. The output of the comparator 115 is applied to the data input D of the flip-flop 109. The $\overline{Q}$ output of the flip-flop 109, which is not used in the circuit of FIG. 2, goes to the logic value of the signal at the D terminal when a clock pulse is applied to the CLK input. Thus, the $\overline{Q}$ output of the flip-flop goes to the logical opposite of the signal applied to the D input when the flip-flop is clocked. The $\overline{Q}$ is connected to an inverting input of the OR 93.

The inverting input of the comparator 115 is also connected through the RC pin of the IC 29 to the timing capacitor 77 (see FIG. 1). The other side of the capacitor 77 is connected to VPOS. Under normal circumstances, the capacitor 77 is discharged by the shunt resistor 79. Therefore, the output of the comparator 115 is low. When the output of the window comparator 97 goes low for the first time, indicating a sputtering arc fault event, the flip-flop 109 is clocked by the leading edge of the pulse. As the D input was low at the time of the clock pulse, the $\overline{Q}$ output remains high, and no gate signal is applied to the SCR 39 through the OR 93. When the output of the window comparator 97 goes low, the capacitor 77 charges rapidly through the diode 113 to approximately VPOS. As the voltage on the noninverting input now exceeds the reference voltage, the output of the comparator 115 goes high. When the output of the window comparator 97 again goes high as the sputtering arc current reaches its peak magnitude, the capacitor 77 begins to discharge through the resistor 79. The values of these components are selected so that the voltage on the capacitor 77 remains above the reference voltage applied to the comparator 115 for the selected time interval. As mentioned, a suitable time interval is about one second. If the output of the window comparator 97 goes low before the timer has timed out, which is indicative of a sputtering arc fault, the D input of the flip-flop 109 will be high when the flip-flop is clocked, and hence the $\overline{Q}$ output will go low, causing the output of OR 93 to go high and gate the SCR 39 on to energize the trip solenoid 41.

Figure 3:
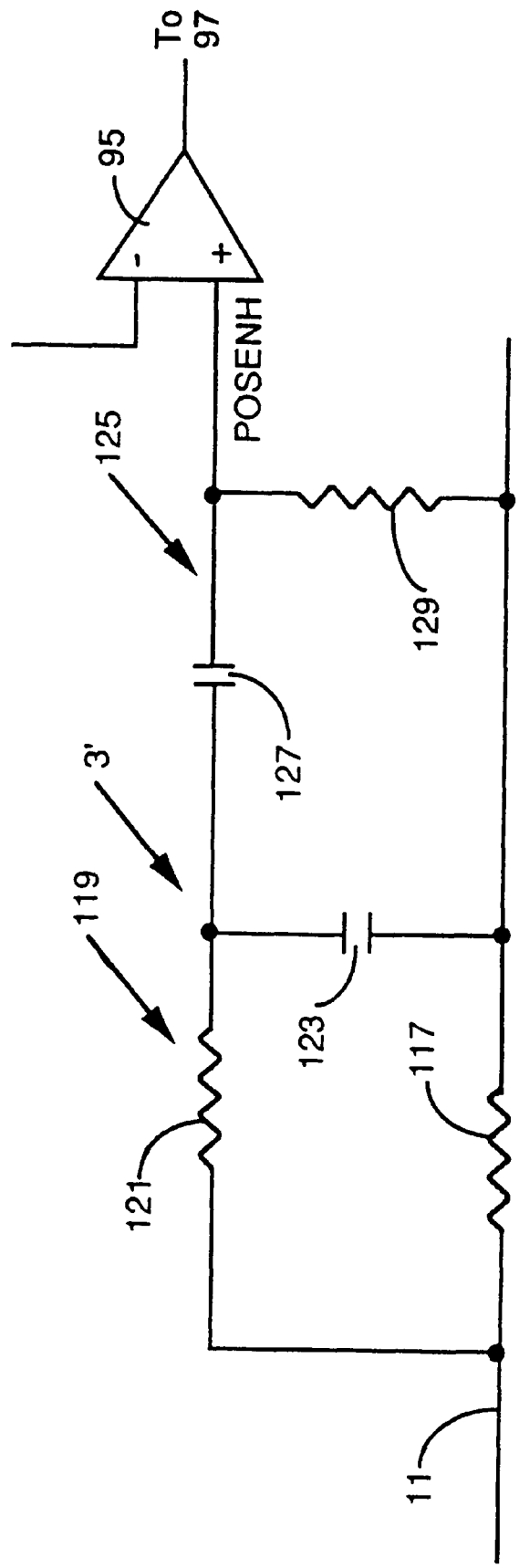
FIG. 3 is a schematic diagram illustrating a modification to a portion of the circuit breaker of FIG. 1.

The sputtering arc fault detector 3 can be used independently of ground fault detection. In that case, the line conductor 9, rather than the neutral conductor 11, would pass through the core of a current sensing transformer 23. Also, if the sputtering arc fault detection is to be provided independent of ground fault protection, the resistance of the neutral conductor could be used to detect sputtering arc faults. FIG. 3 illustrates a portion of the circuit breaker 1 with the sputtering arc fault detector 3' so modified. As shown, the resistivity 117 of the neutral conductor 11 generates a voltage which is passed through a low pass filter 119 comprising the resistor 121 and capacitor 123. The output of this low pass filter is then differentiated by a highpass filter 125 comprising a capacitor 127 and resistor 129. This combination of a low pass filter 119 followed by a high pass filter 125 produces the same bandwidth limited di/dt signal as the coil circuit of FIG. 1, although at a significantly lower signal level. As in the case of the circuit breaker of FIG. 1, the bandwidth limited di/dt signal is applied to the noninverting input of the follower amplifier 95. The remainder of the sputtering arc detector circuit 3' is the same as shown in FIG. 1.

Other variations of the sputtering arc fault responsive circuit breaker 1 are possible. For instance, in place of the window comparators 85 and 97, single comparators can be preceded by full wave rectifiers. Also, other counter circuits to count the sputtering arc fault events could be used. One variation with a higher pin count, but with no digital devices, and therefore possibly a higher noise immunity, utilizes a storage capacitor along with an additional R-C network and simple gating means. The storage capacitor is charged by the level detection means, and the capacitor terminal is also connected to one of two gate inputs via the R-C delay network. The output of level detection means is also directly applied to the second gate input, so that two outputs of the level detection means are required to produce a gate output.

Another possibility for the counter circuit is a monostable multi-vibrator, which would produce a constant width output pulse in response to the input from the level detection means. The constant width output pulses would be integrated and level detected to provide a trip on the second (or any other desired) pulse.

The improved circuit breaker of the invention, which trips on the second pulse generated by a sputtering arc fault, provides improved discrimination between arcing wiring and appliance turn-on. The improvement allows the sensing level to therefore be set much lower than otherwise would be possible.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A circuit breaker for protecting an ac electrical system, said circuit breaker comprising:

a housing;

a set of contacts mounted in said housing;

an electrical conductor connected to said electrical system and to said set of contacts and through which current of said ac electrical system flows;

a current sensor connected across a selected portion of said electrical conductor and utilizing resistivity of said selected portion of said electrical conductor to detect said current flowing through said set of contacts;

trip means connected to said current sensor and generating a trip signal in response to predetermined conditions of said current; and means opening said set of contacts to interrupt said current flowing in the ac electrical system in response to said trip signal.

2. The circuit breaker of claim 1 wherein said trip means generates said trip signal in response to conditions of said current flowing through said ac electrical system indicative of an arc fault.

* * * * *